United States Patent [19]

Giammarco et al.

[11] 4,248,608
[45] Feb. 3, 1981

[54] PROCESS FOR PURIFYING LIQUIDS AND/OR REGENERATING ABSORBENT SOLUTIONS

[76] Inventors: Giuseppe Giammarco; Paolo Giammarco, both of San Marco 3242, Palazzo Morolin, Venezia, Italy

[21] Appl. No.: 34,036

[22] Filed: Apr. 27, 1979

[51] Int. Cl.³ .............................................. B01D 53/14
[52] U.S. Cl. ........................................ 55/43; 55/48; 55/54; 55/73
[58] Field of Search .................... 55/38, 40, 43, 48, 49, 55/54, 73

[56] References Cited
U.S. PATENT DOCUMENTS

| | | | |
|---|---|---|---|
| 2,241,717 | 5/1941 | Robinson et al. | 55/40 X |
| 3,659,401 | 5/1972 | Giammarco | 55/43 |
| 3,664,091 | 5/1972 | Hegwer | 55/73 X |
| 3,709,976 | 1/1973 | Tarhan | 55/73 X |
| 3,816,976 | 6/1974 | Stark et al. | 55/48 |
| 3,847,570 | 11/1974 | Gunther | 55/73 |
| 3,962,404 | 6/1976 | Giammarco et al. | 55/38 X |
| 4,035,166 | 7/1977 | Van Hecke | 55/38 |

FOREIGN PATENT DOCUMENTS

1048557  1/1959  Fed. Rep. of Germany .............. 55/38

Primary Examiner—Robert H. Spitzer
Attorney, Agent, or Firm—Sughrue, Rothwell, Mion, Zinn and Macpeak

[57] ABSTRACT

The process for the purification of liquids and in particular the regeneration of spent absorbent solutions is essentially based on the use of a first preliminary regeneration zone to which the entire solution to be purified is delivered and the use of two terminal regeneration zones operating respectively at a higher and a lower pressure. The semi-regenerated solution issuing from the preliminary purification zone is split into two fractions which are delivered respectively to the low pressure and the high pressure terminal zones. The fraction delivered to the high pressure terminal zone is regenerated by steam yielded by means of the supply of external heat to the bottom of the zone. The fraction delivered to the low pressure terminal zone is regenerated by steam produced by heat recovered from the high pressure terminal zone.

18 Claims, 6 Drawing Figures

PROCESS FOR PURIFYING LIQUIDS AND/OR REGENERATING ABSORBENT SOLUTIONS

The present invention relates to an improvement in the processes in which the operating scheme comprises, broadly speaking, a stage in which a liquid of any nature and origin, used in or inherent to said processes, is treated with a stream of steam to purify or regenerate said liquid, by removing the gaseous impurities present in the latter.

A case of particular importance consists of the processes for the removal of $CO_2, H_2S, SO_2$, HCN and similar impurities from gaseous mixtures containing the same by means of solutions of suitable chemical nature, which are cyclically circulated through an absorption stage and a regeneration stage. The gaseous impurities absorbed at the absorption stage are removed from the solutions and discharged to the outside at the regeneration step, in which the absorbent solution is treated with a stream of steam produced by supply of external heat. The solution thus regenerated is recycled to the absorption stage, as is known in the art. As is well known to those skilled in the art, the absorbent solutions used in the above processes are solutions of alkali metal carbonates, simple or activated by addition of $As_2O_3$, glycin or similar aminoacids, ethanolamines; other useful solutions are those of alkali metal phosphates, borates and phenates, the solutions of ethanolamine in water or sulpholene, solutions of sulphite or bisulphite (in the case of the absorption of $SO_2$), liquids of an organic nature for the dissolution of hydrocarbons and the like.

An other case relates to the processes in which organic liquids are used to remove gaseous impurities, such as benzene, toluene, methane and other hydrocarbons, from gaseous mixtures containing the same. In this case also, the operating scheme comprises a regeneration stage in which the absorbent liquid is treated with a stream of steam to remove from said liquid the gaseous impurities previously absorbed.

Another application case of the present invention relates to the processes for degassing and purifying the boiler feed waters; in fact, it is known that said waters are generally treated with a stream of steam to remove the $CO_2$ and the oxygen present in said waters.

Another application case of the present invention is the case in which the condensation waters obtained in various processes, and in particular in the above processes for the removal of $CO_2$ and/or $H_2S$, are treated with a stream of steam to remove from these various gaseous impurities, such as $CO_2$, ammonia, methanol and the like, to re-use said waters for industrial purposes, or to discharge these to the outside in conditions complying with the ecological requirements. The purification of other liquids or water and the removal of the impurities present in the latter for ecological reasons, is also an application of the present invention.

The object of the present invention is basically that of reducing the heat consumption with respect to that which was required hitherto in the known art for a similar purification of the liquids and/or a similar regeneration of the absorbent solutions.

Thus, the present invention, as above specified, relates to the removal of gaseous impurities present in liquids which may be either liquids to be purified or absorbent solutions to be regenerated, as specified above. Therefore, in the following description reference can be made indifferently to one of the two cases specified hereinbefore.

Another object of the present invention is to obtain, by using a given quantity of heat, a degree of regeneration of the absorbent solution (or a degree of purification of the liquid), which is better than the degree which can be achieved by using this given quantity of heat according to the hitherto known art.

These objects are achieved by carrying out the purification of the liquid (or the regeneration of the absorbent solution) in two columns operating respectively at a higher and a lower pressure; the heat supplied from the outside is delivered to the column operating at higher pressure, and is used herein to purify the liquid delivered to said column; the steam in mixture with the impurities is exited from the top and delivered to the bottom of the column operating at a lower pressure, and further used therein, in secondary effect, to produce pure steam (by means of thermal transmission devices and other claimed devices), which is used for purifying the liquid delivered to said column operating at a lower pressure.

However, it should be noted that the above scheme, if it were practiced as described above, would present important technical difficulties, because the steam discharged with the desorbed gaseous impurities from the top of the column at higher pressure, is highly impaired by the presence of said impurities, which by lowering its dew-point, make difficult its second use in the column at lower pressure.

To avoid this drawback, the present invention provides various embodiments, and in particular that according to which the purification or regeneration of the liquid is carried out first in an initial zone of the regeneration column, to remove from said liquid the bulk of the gaseous impurities present in the latter, and is then completed in two terminal zones operating respectively at a higher and a lower pressure; the heat supplied from the out side is delivered to the terminal zone operating at a higher pressure; the residual steam which is exited from this last zone after its utilization in said zone, has accordingly a relatively modest content of gaseous impurities (about 5-10%, as will be specified in the following), since the liquid delivered to this zone at higher pressure has already been purified. This permits said steam to be used more easily and more conveniently in double effect in the terminal zone at lower pressure.

This second utilization (in double effect) can be achieved by means of a thermal transmission device (when it is possible to operate by maintaining between the two columns a difference in pressure such that in the column at higher pressure the liquid does not exceed the temperature chemically acceptable by said liquid), or by means of pure steam produced by using other more suitable embodiments which will be described and claimed in the following. In most cases it is sufficient that the gaseous impurities be present in amounts not exceeding 5-10% with respect to the mixture (steam+-gaseous impurities).

For a better understanding of the above considerations, it is suitable to recall that the quantity of steam, and thus of heat, necessary to achieve a given degree of regeneration of the solution, essentially depends on the equilibrium conditions in the final part of the regeneration. In fact, it is known that the equilibrium curve of vapour pressure of the gaseous impurities to be removed, must always be above the operating line corresponding to the unitary quantity of steam supplied to the system. In the terminal part of the regeneration the curve of vapour pressure is very low and requires the maximum supply of steam. In the intermediate and initial parts of the regeneration, the equilibrium conditions are gradually less drastic and the steam coming from the final part located below is in excess—and sometimes in large excess—with respect to the quantity which is necessary for the equilibrium. As is known, this steam is excess is discharged to the outside and lost.

The above considerations are well known to those skilled in the art. It is known for example that in the art of removing $CO_2$, the regeneration of an activated potash solution up to a degree of regeneration sufficient for the removal of $CO_2$ up to a residual content of 0.1% from a gas at 26-28 atmospheres, 150-180 kg steam/m$^3$ solution are required in the final part of the regeneration (second step solution). This tremendous quantity of heat is in large excess in the initial (higher) part of the regeneration (first step). Therefore, the quantity of first step solution is suitably increased (about three times that of the second step solution) and the quantity of steam is correspondingly reduced to 50-60 kg steam/m$^3$ solution.

This fact is still more striking in the case of the removal of $H_2S$ by means of solutions of ethanolamines, such as MEA, DEA and the like. The final part of the regeneration requires about 100-130 kg steam/m$^3$ solution and this steam is then in large excess and is not used in the initial part of the regeneration, located above, which would on the contrary require only 50-55 kg steam/m$^3$ solution.

According to the present invention and on the basis of what has been specified in the foregoing, the heat supplied from the outside for the regeneration is only that which is necessary or, broadly speaking, sufficient to permit the thermal balance and the equilibrium conditions to be satisfied in the initial regeneration zone.

In the terminal zone, on the contrary, the utilization in double effect of the heat supplied from the outside (a first time in the zone at higher pressure and a successive time in that at lower pressure) permits the achievement of a degree of regeneration higher than that which could be obtained by means of the quantity of heat actually supplied.

The use of the heat in double effect according to the present invention is achieved both with respect to the gaseous phase, as stated above, and also with respect to the liquid phase. As to this liquid phase, the solution regenerated in the zone at higher pressure, and thus at higher temperature, accumulates a quantity of heat which is also used for the regeneration in the terminal zone at lower pressure, by expansion of said solution down to the pressure of said terminal zone.

Figure 1:
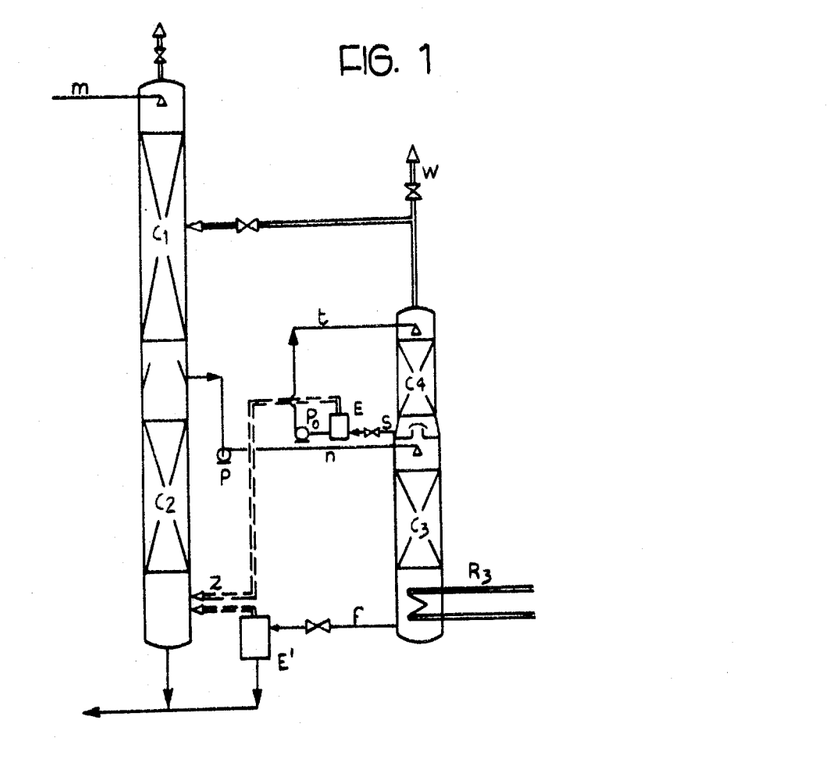
FIG. 1 is a schematic view of the system according to a first embodiment.

In the embodiment of FIG. 1, the solution to be regenerated is delivered through pipe m to the top of the initial zone C1 of the regeneration column operating at lower pressure (in practice approximately at atmospheric pressure). At the outlet of zone C1 the partially regenerated solution is then divided into two fractions (generally two equal fractions), the first fraction being passed downwards through the terminal zone C2 of the lower pressure column. The other fraction is taken up by pump P and delivered through pipe n to the top of the terminal zone $C_3$ of the column operating at higher pressure. The heat is supplied from the outside to said zone C3 by means of reboiler R3, or else in the form of direct steam. At the top of said zone C3 there is recovered a gaseous mixture containing the desorbed impurities and the residual part of the steam delivered for the regeneration (lessened by the possible reaction heat and the heat consumed for the heating of the liquid due to the increase in boiling temperature of the latter).

For the use in double effect, in the terminal zone C2 at lower pressure, of the heat contained in said gaseous mixture, it is suggested and claimed in the present specification to send said mixture to a heat recovery zone C4, operating at the same pressure as in zone C3, in which it is contacted with a stream of water (or else another aqueous liquid or the solution itself) delivered through pipe t, which absorbs practically the whole of the steam, being heated up to about the dew-point of said gaseous mixture at the pressure of zone C4, whereas the gaseous impurities which are not absorbed by the water are discharged by means of pipe w, and delivered to zone C1, or discharged to the outside, as will be specified in the following.

The said water (or other liquid) thus heated is delivered through pipe s to chamber E, where it is expanded down to the pressure of zone C2 at lower pressure, yielding the steam which is delivered to said zone C2 through pipe z, and used therein to regenerate the fraction of solution coming from zone C1. The liquid, upon expansion, is taken up by pump Po and recycled by means of pipe t to the heat recovery zone C4.

Moreover, it should be noted that, as specified hereinbefore, the heat supplied from the outside to zone C3 at higher pressure, is found back not only in the gaseous mixture of steam and impurities but also in the regenerated solution, since the boiling temperature is increased due to the higher pressure used in zone C3. This heat is also delivered to the zone C2 at lower pressure, insofar as the solution regenerated in zone C3 is delivered by means of pipe f to the expansion chamber E', and expanded therein with production of steam which is delivered to zone C2, as shown in FIG. 1 and as will be explained in the following.

Both heats thus recovered, contained respectively in the gaseous phase and the liquid phase, after having been used for the regeneration of the solution in zone C2, are passed upwardly through initial zone C1, where the quantity of solution is higher (generally twice) than in zone C2. This permits a more convenient use of said heats without the aforesaid wastage which, as specified hereinbefore, is a characteristic of the hitherto known art.

As a result, it is possible to achieve a degree of regeneration of the solution which was obtained in the conventional art only by supplying heat in noticeably higher quantities. In general, when using the embodiment shown in FIG. 1, said degree of regeneration corresponds approximately to that achieved by means of the supply of a double quantity of heat from the outside.

Figure 2:
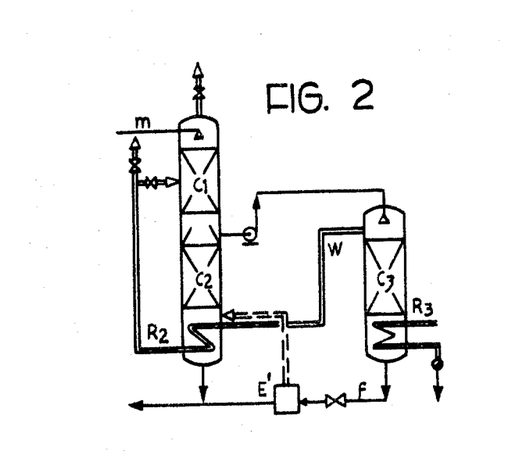
FIG. 2 is a schematic view of a second embodiment according to the present invention.

In the embodiment shown in FIG. 1, the passage of heat in "double effect" from zone C3 to zone C2 requires a very modest difference in temperature and thus in pressure between the two zones respectively at a high and a low pressure, owing to the fact that the heat is yielded by direct contact and not by thermal transmission (as is the case in the embodiment of FIG. 2). This is advantageous and sometimes indispensable when the liquid to be purified or the solution to be regenerated is of a nature or a chemical composition which does not permit the use of a too elevated temperature in the zone C3 at higher pressure.

A different embodiment of the present invention is shown in FIG. 2. This embodiment is fully similar to that shown in FIG. 1, with the difference that the zone C4 of FIG. 1 for the heat recovery, and the various connections with the latter, are suppressed. The solution to be regenerated is delivered through pipe m and the heat is supplied from the outside by means of reboiler R3; the gaseous mixture of steam and desorbed impurities which, as specified in the foregoing, is exited from the top of zone C3 at higher pressure, is delivered through pipe w to reboiler R2 located at the bottom of zone C2 at lower pressure, and its heat is used therein in double effect by thermal transmission, thus producing pure steam which is used with major benefit as desorbing means. The solution regenerated in zone C3 is delivered through pipe f to chamber E' and expanded therein with production of steam. As shown in FIG. 2, the residual steam and the impurities issuing from reboiler R2 are delivered to the upper part of zone C1, or else discharged to the outside, as will be specified in the following.

This scheme requires a difference in temperature, and thus in pressure, between the two zones C2 and C3, which is somewhat higher than in the case of the embodiment of FIG. 1. In the practical cases relating to the processes for the removal of $CO_2$ and/or $H_2S$, this difference in temperature is about 20–25° C. (corresponding to a difference in pressure of about 1–1.3 atmospheres between the two zones).

When using the reboiler, the scheme is simplified, with consequent loss, however, of the advantage of the method based on the circulation of water of FIG. 1, in which the cost of said reboiler was avoided and a higher amount of heat was recovered in double effect, with a lower difference in pressure.

The embodiments of FIGS. 1 and 2 can be modified by arranging zones C2 and C3, respectively at a lower and a higher pressure, in series rather than in parallel.

Figure 3:
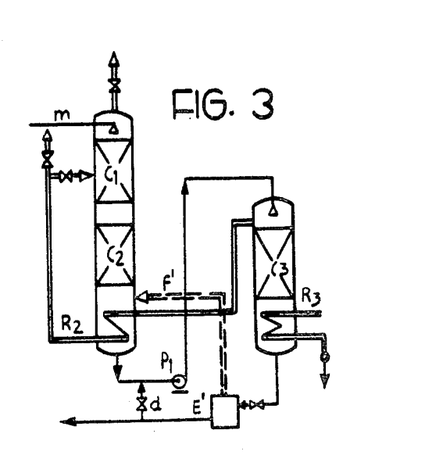
FIG. 3 is a schematic view of a third embodiment according to the present invention.

In the embodiment shown in FIG. 3, the liquid to be purified delivered through pipe m, is passed in series through the whole of the column at lower pressure, namely through zone C1 and through zone C2 from the bottom of which it is discharged and delivered by means of pump P1 to zone C3 at higher pressure. The heat supplied from the outside (supplied in the embodiment of FIG. 3 by means of reboiler R3) is delivered to zone C3 at higher pressure, and the mixture of steam and gaseous impurities is exited from the top of said zone and delivered (a) in the case of the embodiment of FIG. 1 to zone C4 for the heat recovery, or else (b) in the case of the embodiment of FIG. 1 used also in the embodiment of FIG. 3 to the reboiler R2 located at the bottom of zone C2, when it is preferable to use the embodiment of FIG. 2 (used also in FIG. 3). In this manner the liquid is pre-purified in the initial zone C1 and in zone C2 located below the former. The purification is then completed in zone C3 at higher pressure by means of heat supplied from the outside.

In the embodiment of FIG. 3, the pump P1 can deliver to zone C3 a higher quantity of liquid than that coming from zone C2; in other words, the liquid coming from zone C3, upon expansion in chamber E', is in part taken up by means of pipe d and recycled by means of pump P1. In this way it is possible to increase the portion of heat delivered from zone C3 to zone C2 by means of the liquid, through pipe f', and to decrease the quantity of heat contained in the gaseous mixture of steam and impurities at the top of zone C3, which in the embodiments of FIGS. 1 and 2 is delivered to zone C2 by means of a reboiler or water circulation.

Figure 4:
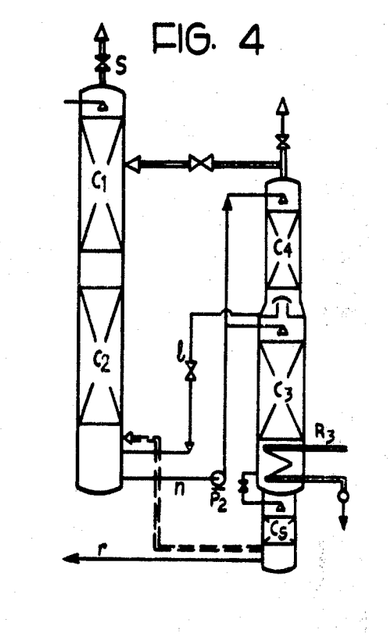
FIG. 4 is a schematic view of a fourth embodiment according to the present invention.
Figure 5:
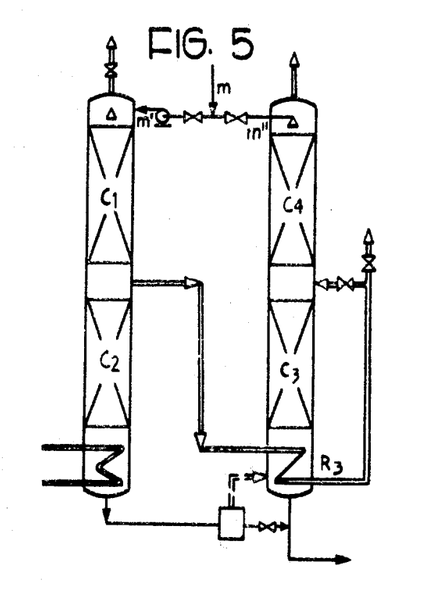
FIG. 5 is a schematic view of a fifth embodiment according to the present invention.

Moreover, it should be noted that the embodiments of FIGS. 1–3, as those of the following FIGS. 4 and 5, can be simplified by delivering from zone C3 to zone C2 only the heat contained in the regenerated solution which is passed from zone C3 to zone C2, whereas the heat contained in the gaseous mixture of steam and impurities at the top of zone C3 can be used by delivering this mixture to the initial zone C1 at low pressure, to a level at which the gaseous phase has about the same composition. In this way only a part of the heat supplied in zone C3, namely that stored in the solution due to the higher pressure, is delivered to zone C2 in double effect. Therefore, the solution to be purified, after passage through zone C1, is divided between zone C2 and zone C3 in proportion to the amount of heat which is delivered from zone C3 to zone C2 in double effect.

The embodiment of FIG. 4 is a variant of the embodiment (arrangement in series of the terminal zones at higher and lower pressure) shown in FIG. 3. In this embodiment the reboiler R2 is suppressed and replaced by a zone C4 for the recovery of heat.

More particularly, the gaseous mixture of steam and gaseous impurities exited from the top of zone C3 is delivered at the same pressure to zone C4 for the heat recovery. A stream of solution, discharged from the bottom of zone C2, is delivered to the top of zone C4 and recovers the heat of the steam from the gaseous mixture in said zone, absorbing the steam and being heated. The solution thus heated is excited from zone C4 and delivered to the bottom of zone C2 through pipe 1, where it is expanded with production of steam; the solution can then be recycled by means of pump P2 and pipe n.

The choice between the arrangement of the two zones in parallel (embodiments of FIGS. 1 and 2), or in series (embodiments of FIGS. 3 and 4) can be effected in each individual case according to the different application conditions.

In FIG. 4 is shown a further improvement consisting in the fact that the regenerated solution issuing from zone C3 at higher pressure, is expanded in the zone C5 at lower pressure, located below, with production of steam which is brought into contact with the said solution flowing in the same direction, thus improving its degree of regeneration. The expansion steam is then delivered to zone C2, whereas the solution is sent for use by means of pipe r. The same expedient can also be used in the case of the embodiments shown in the other Figures.

FIG. 5 corresponds to another embodiment of the present invention, in which the solution to be regenerated, delivered by means of pipe m, is divided into two fractions (generally about equal fractions) which are delivered by means of pipes m' and m" to a column operating at higher pressure and a column operating at lower pressure.

Both columns comprise an initial regeneration zone and a terminal regeneration zone; in particular, the column at higher pressure comprises zones C1 and C2 and the column at lower pressure comprises zones C4 and C3. The external heat is delivered to terminal zone C2 of the column at higher pressure; the mixture of steam and desorbed gaseous impurities is divided at intermediate height of the column at higher pressure (namely at the top of the terminal zone C2 into two fractions, the first fraction being passed upwardly through initial zone C1 of the column at higher pressure, and the second fraction being delivered to reboiler R3 located within the terminal zone C3 of the column at lower pressure, where its heat is used in double effect. Instead of being used by means of said reboiler, the heat of the gaseous mixture issued at intermediate height of the column at higher pressure can also be recovered by means of circulation of water, or another liquid, or the absorbant solution itself, as specified in the case of the embodiments of FIGS. 1 and 4.

An advantage of the embodiment of FIG. 5 consists in the fact that the gaseous impurities removed from the solution in the zone at higher pressure (generally about half of the total) are available at said higher pressure.

Finally, it is possible and in most cases noticeably advantageous, in the embodiments of FIGS. 1-5, to regenerate to a higher extent the solution delivered to the terminal zone at higher pressure and to regenerate to a lower extent the solution delivered to the terminal zone at lower pressure. The two solutions are then used according to their different degrees of regeneration, as is known to those skilled in the art.

Figure 6:
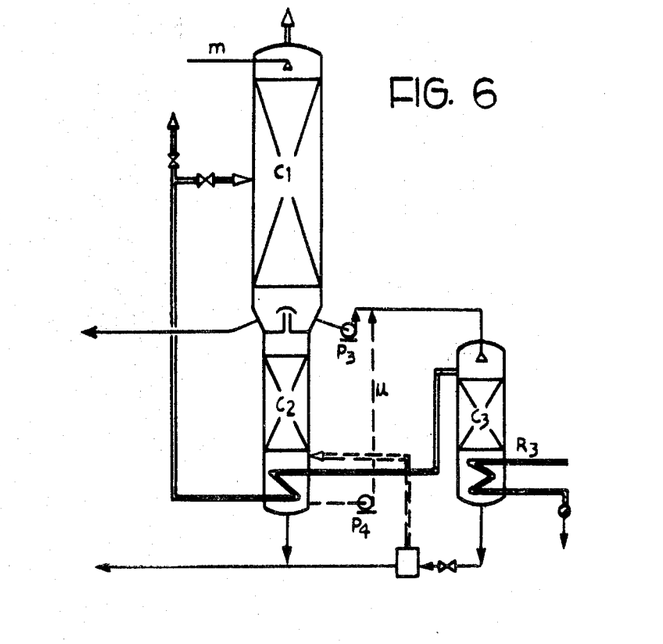
FIG. 6 is a schematic view of a sixth embodiment according to the present invention.

The embodiment of FIG. 6 corresponds to a practical example of application of the present invention to a regeneration column in the case of a two-stage cycle of the type used for the removal of $CO_2$. This embodiment can be applied with advantage in the cases in which the plant is modified to increase its production capacity, or else to improve the purification of the gas.

As shown in FIG. 6, a part of the solution of the first stage is taken up by pump P3 and is sent under pressure to the lateral column C3 operating at higher pressure. In this column external heat is supplied by means of reboiler R3, and is then used in double effect in zone C2.

Accordingly, the regenerated solution (that is the solution of the second stage) is about $\frac{2}{3}$ of the total solution delivered by means of pipe m to zone C1, at the top of the regeneration column at lower pressure, whereas the semi-regenerated solution of the first stage is about $\frac{1}{3}$ of the total solution. In the conventional art the regenerated solution is on the contrary about $\frac{1}{3}$ and the semi-regenerated solution about $\frac{2}{3}$ of the total solution. As a result, there is obtained a noticeable improvement in the functioning of the purification cycle.

The above embodiment is an example of the numerous embodiments which can be devised for the same purpose. For example, the scheme of the arrangement in series of zones C2 and C3 can be used with advantage. To this end, it is sufficient that the pump P3 be replaced by the pump P4 and that the solution be exited from the bottom of zone C2 and delivered to zone C3 by means of pipe u shown in dotted lines in the Figure.

Finally, it should be noted that the process of the present invention is particularly advantageous in the case of the simultaneous removal of $CO_2$ and $H_2S$ from gaseous mixtures containing the same, such as natural gases, synthesis gases and the like.

This advantage consists in the fact that, in the various embodiments described hereinbefore, with particular reference to those of FIGS. 3, 4 and 5, the absorbent solution is regenerated firstly in the initial zone C1 and in the terminal zone C2 at low pressure, yielding therein the bulk of the $H_2S$ it contains (in fact it is known that the removal of $H_2S$ is noticeably more rapid than that of $CO_2$), and its regeneration is completed in the zone C3 at higher pressure in which there is evolved mainly $CO_2$, together with small amounts of $H_2S$. This permits the delivery of the acidic gas rich in $H_2S$, issuing from the top of zone C1, to a Claus furnace or for another similar utilization (taking advantage of the higher concentration of $H_2S$), whereas the acidic gas issuing at higher pressure from zone C3, rich in $CO_2$ and poor in $H_2S$, upon utilization of the heat present in the latter in the heat recovery zone C4 or in the secondary reboilers R2, is discharged to the outside, upon removal of the remaining quantities of $H_2S$ by conversion of the latter into $SO_2$ by the Oxycat catalytic process, or by flaring the gas at 1100°-1200° C., or by means of other suitable methods.

It is also possible to obtain at the regeneration stage of the solution, a noticeable quantity of $CO_2$ in the pure state. To this end the solution is regenerated in the initial zone of the regeneration column to an extent such as to desorb therein nearly the whole of the absorbed $H_2S$, the regeneration being then completed in the terminal zone at higher pressure with removal of practically pure $CO_2$, which, upon utilization of the steam present in mixture with the layer, is extracted and sent for use.

Finally, with reference to the embodiment shown in FIG. 5 which is particularly advantageous in numerous cases, it should be noted that the steam circulating upwardly through the column at higher pressure removes mainly $H_2S$ in the upper part, whereas $CO_2$, whose removal from the solution is known to be slower, is desorbed in the lower part. As a result, the fraction of gaseous mixture of steam and acidic gas which in the embodiment of said FIG. 5 is exited from the column at higher pressure to be used in double effect in the column at lower pressure, is extracted from the aforesaid column at the level where the content of $H_2S$ accompanying $CO_2$ corresponds to the desired tolerable value. In this case also, it is possible to obtain practically pure $CO_2$.

Operating in this manner it is therefore possible to achieve at the regeneration stage a selective removal of $H_2S$ with respect to $CO_2$, whereas it was tried for long to obtain said selective removal at the absorption stage.

As specified in the foregoing, the embodiment shown in FIGS. 1 to 6 may be considered as generic application examples. The following application example further illustrates the invention.

EXAMPLE 845,000 $Nm^3$/hour of a gaseous mixture comprising 73% of methane and higher homologous compounds, 3% of $N_2$, 3% of $H_2S$ and 21% of $CO_2$ are purified down to residual contents of 2% of $CO_2$ and 4 ppm of $H_2S$ by using the embodiment of FIG. 2.

To this end there are used 5,910 $m^3$/hour of potash solution activated with glycin, which absorbs the impurities up to a pick-up of 35 volumes/volume. The solution is introduced at the top of the initial zone C1 of the column at lower pressure (1.1 atmospheres) and is divided at the level of the terminal zone into two fractions, equal to 2,955 m³/hour; the first fraction is passed downwards through terminal zone C2 and the second one is taken up by the pump, as shown in FIG. 2, and delivered to the terminal zone C3 of the column operating at higher pressure (2.8 atmospheres). This last fraction is treated therein with 100 kg steam/m³ solution obtained by means of the main reboiler R1, that is 50 kg steam/m³ total solution. The pressure of this steam is 5 atmospheres.

At the top of zone C3 there is obtained a gaseous mixture comprising 15% of $CO_2+H_2S$ and 85% of steam, which is fed to the secondary reboiler R2 located within zone C2, where the major part of the steam is condensed and its heat equal to 33.5 kg steam/m³ solution is used for the regeneration. The $CO_2$ and $H_2S$ thus desorbed are discharged to the outside with a residual steam content of about 1.2 kg steam/m³ desorbed gas.

The solution regenerated in terminal zone C3 at the boiling temperature of 135° C. is expanded down to a pressure of 1.2 atmospheres, thus supplying to the terminal zone C2 46.5 kg steam/m³ solution. Therefore, the overall supply is about 80 kg steam/m³ solution.

In summation, with an overall supply of external heat of 295,500 kg steam/hour, corresponding to 50 kg steam/m³ total solution, there is obtained an average degree of regeneration of the two solutions corresponding to the supply of 90 kg steam/m³ total solution.

The solution extracted from the bottom of the two terminal zones C2 and C3 are combined and sent for use.

We claim:

1. In a process for the purification of liquids and the regeneration of absorbent solutions by treatment with steam in a purification column, to remove gaseous impurities present in said liquids and solutions, the improvement which comprises:

using a purification column comprising a preliminary purification zone, two terminal purification zones, operating respectively at a higher pressure and a lower pressure, and a heat recovery zone;

delivering the liquid or solution to be purified to said initial zone and, at the outlet from the latter, dividing said liquid or solution into two fractions, the first fraction being delivered to the terminal zone at lower pressure and the second fraction being delivered by pumping to the terminal zone at higher pressure;

supplying heat from the outside to the terminal zone at higher pressure to produce steam, extracting from the top of the latter said steam produced by said heat, after its utilization in said terminal zone at higher pressure, together with the gaseous impurities desorbed therein, and delivering said steam to the heat recovery zone operating at said higher pressure, contacting said steam therein with a stream of water or other aqueous liquid, which absorbs said steam and is heated, whereas the gaseous impurities accompanying said steam are discharged to the outside; extracting from said heat recovery zone the water or other aqueous liquid thus heated, and expanding it down to the pressure of the terminal zone at lower pressure, to yield steam practically free from gaseous impurities; delivering the steam thus yielded to the terminal zone at lower pressure, and using it therein for the purification of the liquid or solution delivered to this last zone; and recycling said water or other aqueous liquid to said heat recovery zone;

extracting the liquid or solution purified in said terminal zone at higher pressure at the boiling temperature corresponding to said higher pressure, and expanding it down to the pressure of the terminal zone at lower pressure, and delivering the steam thus evolved to the bottom of said terminal zone at lower pressure, to use if for the purification of the liquid or solution delivered to said terminal zone at lower pressure;

extracting the liquids or solutions purified in said terminal zones of the purification column and sending them for use.

2. The process of claim 1, in which the steam which is extracted from the terminal zone at higher pressure and is delivered to the heat recovery zone, contains not more than 10-15% in volume of gaseous impurities.

3. The process of claim 1, in which the solution to be purified is a spent absorbent solution used for the simultaneous absorption of $CO_2$ and $H_2S$ from gaseous mixtures containing the same, the solution is pre-regenerated in the initial zone of the purification column, to remove mainly $H_2S$, and the gaseous mixture desorbed in said initial zone is extracted as an independent stream from the column and sent for use to the outside;

the regeneration of the solution is completed in the terminal zone at higher pressure, to remove mainly the $CO_2$ present in the solution, and the gaseous mixture desorbed in said terminal zone at higher pressure, after its utilization in the heat recovery zone, is extracted as an independent stream from the purification column and sent for use to the outside.

4. In a process for the purification of liquids and the regeneration of absorbent solutions by treament with steam in a purification column, to remove gaseous impurities present in said liquids and solutions, the improvement which comprises:

using a purification column comprising a preliminary purification zone, two terminal purification zones, operating respectively at a higher pressure and a lower pressure, and a heat recovery zone;

delivering the liquid or solution to be purified firstly to the initial purification zone at low pressure, and then, substantially in its totality, to the terminal zone at lower pressure; extracting said liquid or solution from the bottom of said terminal zone at lower pressure, and delivering it in series, by pumping, to the terminal zone at higher pressure;

supplying heat from the outside to the terminal zone at higher pressure to produce steam; extracting said steam produced by said heat from the top of said terminal zone at higher pressure, after its utilization in the latter, together with the gaseous impurities desorbed therein, and delivering it to the heat recovery zone operating at said higher pressure, and contacting it therein with a stream of water or other aqueous liquid which absorbs said steam and is heated, whereas the gaseous impurities accompanying said steam are discharged to the outside; extracting the water or other aqueous liquid thus heated in said heat recovery zone and expanding it down to the pressure of the terminal zone at lower pressure, to yield steam practically free from gaseous impurities; delivering the steam thus yielded to the terminal zone at lower pressure and using it therein for the purification of the liquid or solution delivered to said terminal zone at lower pressure;

and recycling the water or other aqueous liquid to said heat recovery zone;

extracting the liquid or solution purified in said terminal zone at higher pressure at the boiling temperature corresponding to said higher pressure, and expanding it down to the pressure of the terminal zone at lower pressure, to evolve steam which is delivered to the bottom of said terminal zone at lower pressure and used therein for the purification of the liquid or solution delivered to said terminal zone at lower pressure;

extracting the liquids or solutions purified in said terminal zones of the purification column and sending them for use.

5. The process of claim 4, in which the steam which is extracted from the terminal zone at higher pressure and is delivered to the heat recovery zone, contains not more than 10-15% in volume of gaseous impurities.

6. The process of claim 4, in which the solution to be purified is a spent absorbent solution used for the simultaneous absorption of $CO_2$ and $H_2S$ from gaseous mixtures containing the same, the solution is pre-regenerated in the inizial zone of the purification column, to remove mainly $H_2S$, and the gaseous mixture desorbed in said initial zone is extracted as an independent stream from the column and sent for use to the outside;

the regeneration of the solution is completed in the terminal zone at higher pressure, to remove mainly the $CO_2$ present in the solution, and the gaseous mixture desorbed in said terminal zone at higher pressure, after its utilization in the heat recovery zone, is extracted as an independent stream from the purification column and sent for use to the outside.

7. In a process for the purification of liquids or the regeneration of absorbent solutions by treatment with steam in a purification column, to remove gaseous impurities present in said liquids and solutions, the improvement which comprises:

using a purification column comprising an initial purification zone and two terminal purification zones operating respectively at a higher pressure and a lower pressure;

delivering the liquid or solution to be purified to said initial zone, and dividing it, at the outlet of the latter, into two fractions, the first fraction being delivered to the terminal zone at lower pressure and the second fraction being delivered by pumping to the terminal zone at higher pressure;

supplying heat from the outside to the terminal zone at higher pressure to produce steam; extracting said steam produced by said heat from the top of said terminal zone at higher pressure, upon its utilization in the latter, together with the gaseous impurities desorbed therein, and delivering it to a reboiler located at the bottom of the terminal zone at lower pressure, to yield stream which is used for the purification of the liquid or solution delivered to said terminal zone at lower pressure;

extracting from the terminal zone at higher pressure the liquid or solution purified in the latter at the boiling temperature corresponding to said higher pressure, and expanding it down to the pressure of the terminal zone at lower pressure, to evolve steam which is delivered to the bottom of said terminal zone at lower pressure and used therein for the purification of the liquid or solution delivered to said terminal zone at lower pressure;

extracting the liquids or solutions purified in said terminal zones of the purification column and sending them for use.

8. The process of claim 7, in which the steam which is extracted from the terminal zone at higher pressure and is delivered to the heat recovery zone, contains not more than 10-15% in volume of gaseous impurities.

9. The process of claim 7, in which the solution to be purified is a spent absorbent solution used for the simultaneous absorption of $CO_2$ and $H_2S$ from gaseous mixtures containing the same, the solution is pre-regenerated in the initial zone of the purification column, to remove mainly $H_2S$, and the gaseous mixture desorbed in said initial zone is extracted as an independent stream from the column and sent for use to the outside;

the regeneration of the solution is completed in the terminal zone at higher pressure, to remove mainly the $CO_2$ present in the solution, and the gaseous mixture desorbed in said terminal zone at higher pressure, after its utilization in the heat recovery zone, is extracted as an independent stream from the purification column and sent for use to the outside.

10. In a process for the purification of liquids and the regeneration of absorbent solutions by treatment with steam in a purification column, to remove gaseous impurities present in said liquids and solutions, the improvement which comprises:

using a purification column comprising an initial purification zone and two terminal purification zones operating respectively at a lower pressure and a higher pressure;

delivering the liquid or solution to be purified firstly to the initial purification zone at low pressure, and then, substantially in its totality, to the terminal zone at lower pressure; extracting said liquid or solution from the bottom of the latter and delivering it in series, by pumping, to the terminal zone at higher pressure;

supplying heat from the outside to the terminal zone at higher pressure to produce steam; extracting from the top of said terminal zone at higher pressure said steam produced by said heat, after its utilization in the latter, together with the gaseous impurities desorbed therein, and delivering it to a reboiler located at the bottom of the terminal zone at lower pressure, to yield steam which is used for the purification of the liquid or solution delivered to said terminal zone at lower pressure;

extracting the liquid or solution purified in said terminal zone at higher pressure at the boiling temperature corresponding to said higher pressure, and expanding it down to the pressure of the terminal zone at lower pressure, to evolve steam which is delivered to the bottom of said terminal zone at lower pressure and used therein for the purification of the liquid or solution delivered to said terminal zone at lower pressure;

extracting the liquids or solutions purified in said terminal zones of the purification column and sending them for use.

11. The process of claim 10, in which the steam which is extracted from the terminal zone at higher pressure and is delivered to the heat recovery zone, contains not more than 10-15% in volume of gaseous impurities.

12. The process of claim 10, in which the solution to be purified is a spent absorbent solution used for the simultaneous absorption of $CO_2$ and $H_2S$ from gaseous mixtures containing same, the solution is pre-regenerated in the initial zone of the purification column, to remove mainly $H_2S$, and the gaseous mixture desorbed in said initial zone is extracted as an independent stream from the column and sent for use to the outside;

the regeneration of the solution is completed in the terminal zone at higher pressure, to remove mainly the $CO_2$ present in the solution, and the gaseous mixture desorbed in said terminal zone at higher pressure, after its utilization in the heat recovery zone, is extracted as an independent stream from the purification column and sent for use to the outside.

13. In a process for the purification of liquids and the regeneration of absorbent solutions by treatment with steam in a purification column, to remove gaseous impurities present in said liquids and solutions, the improvement comprising:

dividing the liquid or solution to be purified into two fractions, and delivering the first fraction to a main purification column operating at a higher pressure and comprising an intial zone and a terminal zone, and delivering the second fraction to a secondary purification column operating at a lower pressure and comprising also an initial zone and a terminal zone;

supplying heat from the outside to the terminal zone of the main column; dividing at the top of said terminal zone of the main column and mixture of steam and gaseous impurities evolved therein, into two fractions; passing the first fraction upwardly through the initial zone of the main column and extracting the second fraction and delivering it to the terminal zone of the secondary column to use it therein in double effect in a reboiler and yield steam which is used for the purification of the liquid or solution delivered to said terminal zone of the secondary column; passing the steam yielded by said reboiler, upon its utilization in said terminal zone of the secondary column, upwardly through the initial zone of the secondary column;

extracting the liquid or solution purified in said terminal zone of the main column at the boiling temperature corresponding to said higher pressure, and expanding it down to the pressure of the terminal zone at lower pressure of the secondary column, to evolve stream which is delivered to the bottom of said terminal zone of the secondary column and used therein for the purification of the liquid or solution delivered to said terminal zone of the secondary column;

extracting the liquids or solutions purified in said terminal zones and sending them for use.

14. The process of claim 13, in which the steam which is extracted from the terminal zone at higher pressure and is delivered to the heat recovery zone, contains not more than 10-15% in volume of gaseous impurities.

15. The process of claim 13, in which the solution to be purified is a spent absorbent solution used for the simultaneous absorption of $CO_2$ and $H_2S$ from gaseous mixtures containing the same, the solution is pre-regenerated in the initial zone of the purification column, to remove mainly $H_2S$, and the gaseous mixture desorbed in said initial zone is extracted as an independent steam from the column and sent for use to the outside;

the regeneratin of the solution is completed in the terminal zone at higher pressure, to remove mainly the $CO_2$ present in the solution, and the gaseous mixture desorbed in said terminal zone at higher pressure, after its utilization in the heat recovery zone, is extracted as an independent steam from the purification column and sent for use to the outside.

16. In a process for the purification of liquids or the regeneration of absorbent solutions by treatment with steam in a purification column, to remove gaseous impurities from said liquids and solutions, the improvement which comprises:

dividing the liquid or solution to be purified into two fractions; delivering the first fraction to a main purification column operating at a higher pressure and comprising an initial zone and a terminal zone and then a heat recovery zone, and delivering the second fraction to a secondary column operating at a lower pressure and comprising an initial zone and a terminal zone;

supplying heat from the outside to the terminal zone of the main column; dividing at the top of said terminal zone of the main column the mixture of steam and gaseous impurities evolved therein, into two fractions; passing the first fraction upwardly through the initial zone of the main column, and extracting the second fraction and delivering it to the heat recovery zone operating at the same pressure as the main column, and contacting it therein with a stream of water or other aqueous liquid which absorbs the steam present in said second fraction and is heated, while the gaseous impurities present in said second fraction are discharged to the outside; extracting said water or other aqueous liquid thus heated in said heat recovery zone, and expanding it down to the pressure of said terminal zone of the secondary column, to yield steam practically free from gaseous impurities; delivering the steam thus yielded to the terminal zone of the secondary column and using it therein for the purification of the liquid delivered to said terminal zone of the secondary column; and recycling the water or other aqueous liquid to said heat recovery zone;

extracting from the terminal zone of the main column the liquid or solution purified therein, at the boiling temperature corresponding to said higher pressure, and expanding it down to the pressure of said terminal zone of the secondary column, to evolve steam which is delivered to the bottom of said terminal zone of the secondary column and used therein for the purification of the liquid or solution delivered to said terminal zone of the secondary column;

extracting the liquids or solutions purified in said terminal zones and sending them for use.

17. The process of claim 16, in which the steam which is extracted from the terminal zone at higher pressure and is delivered to the heat recovery zone, contains not more than 10-15% in volume of gaseous impurities.

18. The process of claim 16, in which the solution to be purified is a spent absorbent solution used for the simultaneous absorption of $CO_2$ and $H_2S$ from gaseous mixtures containing the same, the solution is pre-regenerated in the initial zone of the purification column, to remove mainly $H_2S$, abd the gaseous mixture desorbed in said initial zone is extracted as an independent stream from the column and sent for use to the outside;

the regeneration of the solution is completed in the terminal zone at higher pressure, to remove mainly the $CO_2$ present in the solution, and the gaseous mixture desorbed in said terminal zone at higher pressure, after its utilization in the heat recovery zone, is extracted as an independent stream from the purification column and sent for use to the outside.

* * * * *

UNITED STATES PATENT AND TRADEMARK OFFICE
CERTIFICATE OF CORRECTION

PATENT NO. : 4,248,608
DATED : February 3, 1981
INVENTOR(S) : Giuseppe GIAMMARCO & Paolo GIAMMARCO It is certified that error appears in the above-identified patent and that said Letters Patent are hereby corrected as shown below:

Please add the following information to page 1 of the patent:

--FOREIGN APPLICATION PRIORITY DATA

April 27, 1978    Italy .................67953-A/78--

Signed and Sealed this

Twenty-third Day of June 1981

[SEAL]

Attest:

RENE D. TEGTMEYER

Attesting Officer    Acting Commissioner of Patents and Trademarks